United States Patent [19]
Tsurubuchi et al.

[11] Patent Number: 4,587,574
[45] Date of Patent: May 6, 1986

[54] TAPE ADDRESS SYNCHRONIZING APPARATUS FOR VIDEO TAPE RECORDER

[75] Inventors: Tetsuo Tsurubuchi; Toru Sekiguchi; Shigeru Araki, all of Tokyo, Japan

[73] Assignee: NEC Corporation, Japan

[21] Appl. No.: 612,685

[22] Filed: May 22, 1984

[30] Foreign Application Priority Data

May 23, 1983 [JP] Japan .................. 58-90175

[51] Int. Cl.$^4$ .................................. H04N 5/782
[52] U.S. Cl. ........................... 360/14.3; 360/73
[58] Field of Search ............ 360/14.1, 14.2, 14.3, 360/10.2, 10.3, 70, 73, 77, 78; 369/59

[56] References Cited

U.S. PATENT DOCUMENTS

| | | | |
|---|---|---|---|
| 4,282,552 | 8/1981 | Tachi et al. | 360/70 |
| 4,322,747 | 3/1982 | Dischert et al. | 360/73 |
| 4,466,029 | 8/1984 | Tanaka | 360/14.2 |
| 4,488,278 | 12/1984 | Dieterich | 369/59 |

Primary Examiner—Donald McElheny, Jr.
Attorney, Agent, or Firm—Ostrolenk, Faber, Gerb & Soffen

[57] ABSTRACT

An apparatus for synchronizing the playback of magnetic tape, use in a VTR, to a reference signal. Reference addresses which are synchronized to the reference signal and tape addresses which are derived from and correspond to video frames located on the tape are generated. The playback speed of the tape is controlled by a capstan servo to select a speed at which the tape addresses and the reference addresses are synchronized. Each tape section corresponding to a single tape address is further subdivided into auxiliary segments which are identified by an auxiliary address. After a reference address and a tape address have been synchronized, the auxiliary address is compared against a predetermined value and the tape is momentarily accelerated or decelerated to further align the tape to the reference signal.

11 Claims, 5 Drawing Figures

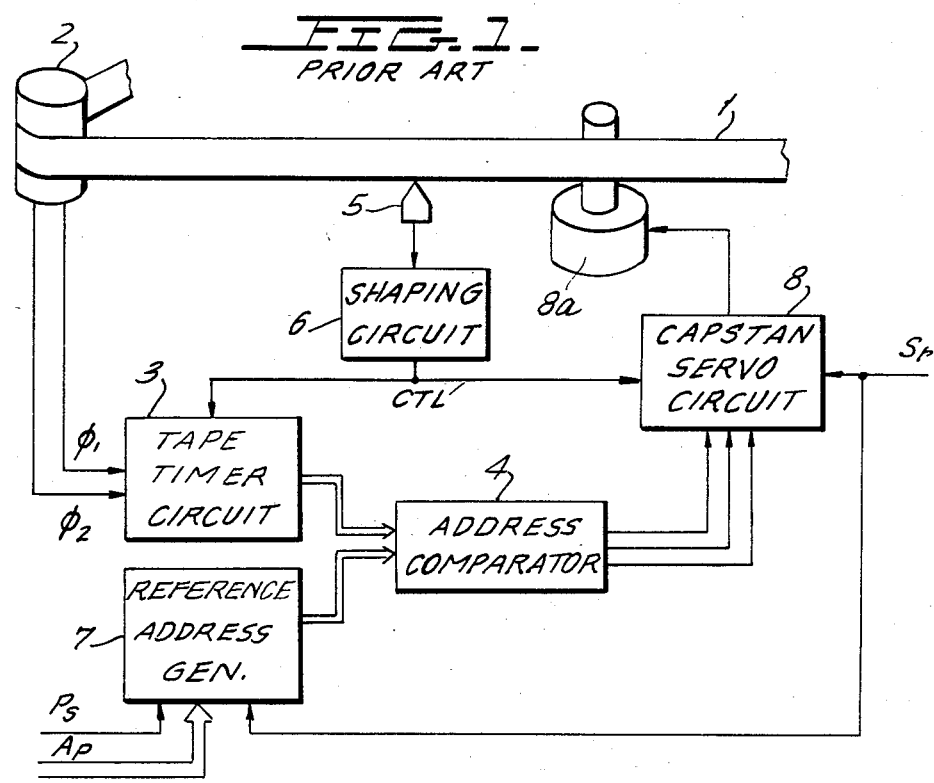
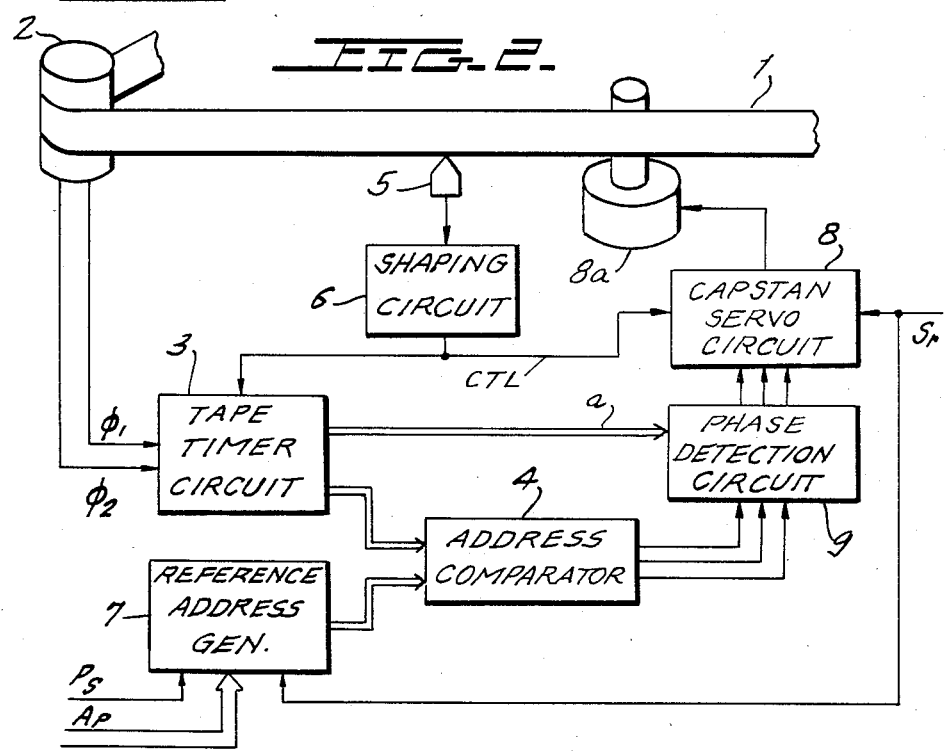

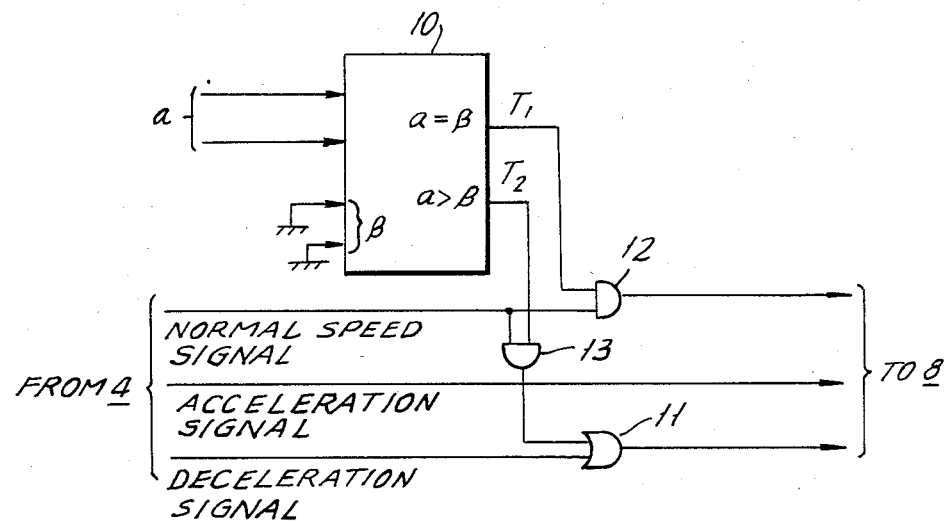
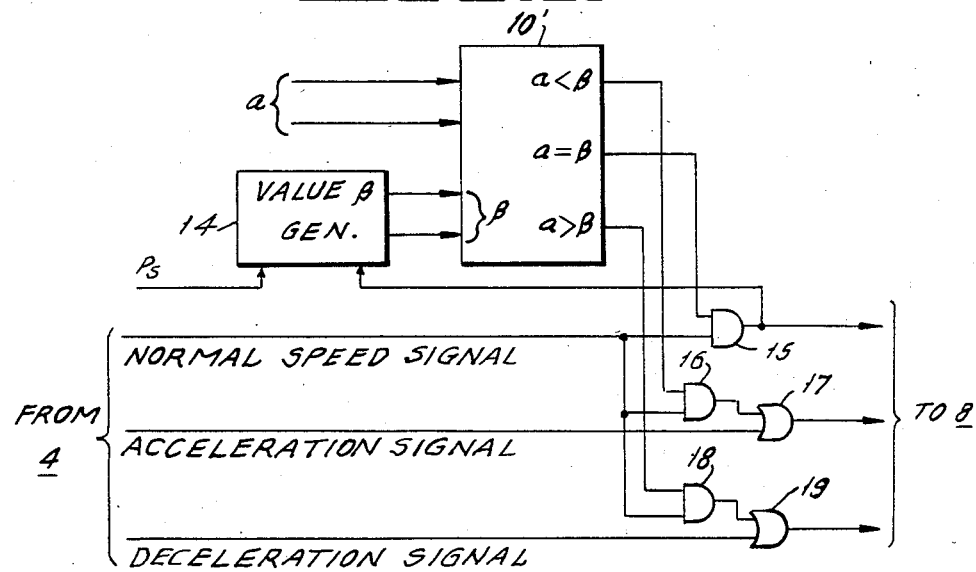

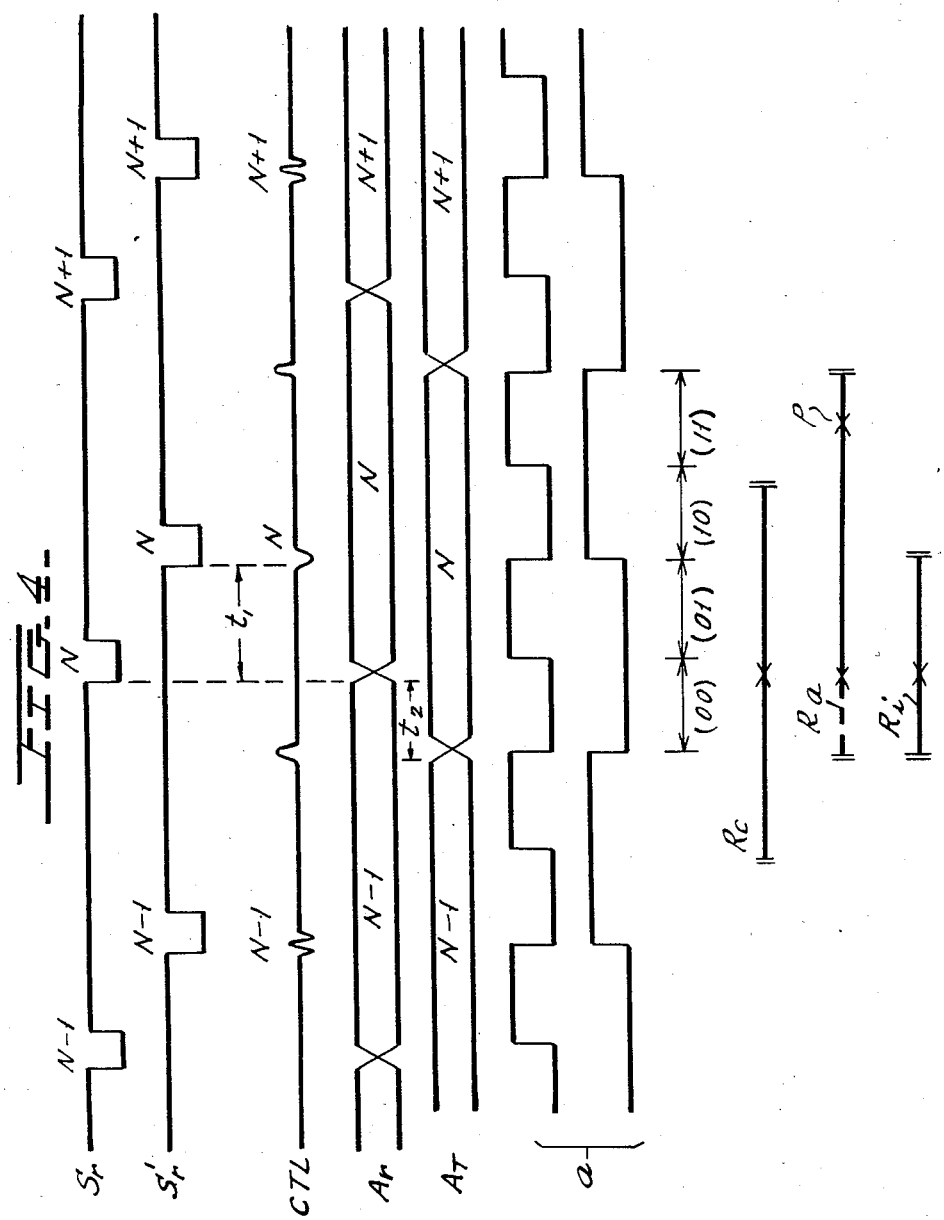

TAPE ADDRESS SYNCHRONIZING APPARATUS FOR VIDEO TAPE RECORDER

BACKGROUND OF THE INVENTION

The present invention relates to a tape address synchronizing apparatus for a video tape recorder (VTR) which equalizes a tape address of the VTR with that of another video tape recorder or with a reference.

Such tape address synchronizing operation is necessary for editing a video program, for example. When the video program is edited into a recording VTR by receiving the video program from a playing VTR, both the recording VTR and the playing VTR rewind their magnetic tape by a predetermined time (pre-roll time) from a certain edit point, first, and, then, both the VTRs turn on in the normal direction. After this, the editing starts at the edit point. However, the edit point in both the VTRs, i.e., the recording VTR and the playing VTR, frequently does not coincide with the tape address synchronizing operation because of a difference in pre-roll times actually set up into the recording VTR and the playing VTR and a difference in mechanical characteristics of the two VTRs. The tape address synchronizing operation equalizes the tape address, i.e., the edit point during the pre-roll time. One method of the tape address synchronizing operation is that a tape address of either the recording VTR or the playing VTR is employed as a reference, and the reference is transmitted to the other VTR which controls its tape speed in order to lock-in with the reference. Another method is that an external reference is applied to both the recording VTR and the playing VTR and the two VTRs control their tape speed in order to lock-in with the external reference. The following description is based on the latter method.

In a prior art tape address synchronizing apparatus for a VTR, a reference address generation circuit, which can be loaded with a preset address, produces a reference address in accordance with an external reference, and the reference address is compared with a tape address which is produced in response to actual tape transportation. The result from the comparison is fed into a capstan servo circuit and a feedback arrangement is used to ensure that the comparison result is driven to zero. In addition, the capstan servo circuit also controls a capstan motor to cause a control track (CTL) signal, which is recorded on a control track of a magnetic tape, coincide with the external reference. Accordingly, after the capstan servo circuit has operated so that there is no difference between the reference address and the tape address, it also makes the CTL signal coincident with the reference. However, since the servo response due to comparing the addresses is independent of the response based on comparing the CTL signal with the reference, the address difference is often changed after the servo operation which aligns the CTL signal with the reference. In such case, both servo operations must be repeated. In consequence the tape address synchronizing operation cannot be completed during the pre-roll time. As a result, accurate editing cannot be accomplished.

SUMMARY OF THE INVENTION

It is an object of the present invention to provide a tape address synchronizing apparatus for a VTR which can complete a precise tape address synchronizing operation during the pre-roll time period of synchronization step.

According to the present invention, there is provided a tape address synchronizing apparatus comprising an address comparator which compares a reference address with a tape address generated on the basis of actual tape transportation, and a phase detector means which can perform a comparison in $\frac{1}{4}$ frame resolusion therewith, whereby a complete tape address synchronizing operation is completed during a predetermined time by making the servo lock-in range for comparing the addresses coincident with the servo lock-in range for comparing the CTL signal with the reference.

BRIEF DESCRIPTION OF THE DRAWINGS

FIG. 1 is a schematic illustration of a prior art tape address synchronizing apparatus for a VTR;

FIG. 2 schematically shows one embodiment of the present invention;

FIG. 3 shows construction of a phase comparator of FIG. 2;

FIG. 4 is a timing chart indicating a tape address synchronizing operation according to the present invention; and FIG. 5 shows a second embodiment of the present invention.

DETAILED DESCRIPTION

The prior art will now be described with reference to FIG. 1. Two timer pulses $\phi_1$, $\phi_2$ each having a different phase of 90° are obtained from a tape timer roller 2. These pulses vary according to the movement of a magnetic tape 1. A tape timer circuit 3 detects the direction of movement of the magnetic tape 1 and produces a tape address for each frame by continuing these pulses. The tape address delivered from the tape timer circuit 3 is applied to an address comparator 4. Simultaneously, a control track (CTL) signal for each frame, which is recorded on a control track of the magnetic tape 1 is picked up by a readout head 5, is shaped by a shaping circuit 6, and is sent to the tape timer circuit 3 as a correction signal. A reference address generation circuit 7 is constructed of a counter which updates an address according to an external reference signal $S_r$. It is initially loaded with a preset address $A_p$ from an external source. The updating of the reference address is started from the preset address $A_p$ by a start pulse $P_s$, and the updated address is transmitted to an address comparator 4. The address comparator compares the address from the tape timer circuit 3 with the reference address from the reference address generation circuit 7, and, in response to the comparison result, generates an acceleration signal, a normal speed signal, or a deceleration signal. These signals are applied to a capstan servo circuit 8 to accelerate or decelerate the rotational speed of a servomotor 8a. The capstan servo circuit 8 drives the servomotor 8a so that the CTL signal from the shaping circuit 6 and the external reference signal $S_r$ are locked (actually, a signal $S'_r$ delayed from the reference signal $S_r$ by a certain value is used). However, the capstan servo circuit 8 reacts to synchronize the CTL signal with the external reference signal $S_r$, only after it has first responded to the inputs that it receives from address comparator 4. That is, first it accelerates or decelerates to servomotor 8a to ensure that the addresses match. Later, after the tape speed has returned to normal it begins the CTL signal to external reference synchronization.

The operation of the prior art will now be further described. First, before the magnetic tape starts to move, a time reference value which is smaller than the edit point time reference by a so-called pre-roll time period is loaded into the reference address generation circuit 7. It is referred to as the preset address $A_p$. For example, when the edit point time reference is 1 hour, 23 min., 00 sec., 00 frame and the pre-roll time is five seconds, the preset address $A_p$ is 1 hour, 22 minutes, 55 seconds, and 00 frame. When the tape transport started, the start pulse $P_s$ is input, and then the address is updated for each frame according to the reference signal $S_r$ (operating as a clock). Accordingly, when five seconds passes after the start pulse $P_s$, the reference address becomes (1 hour, 23 minutes, 00 seconds, and 00 frame). The address comparator 4 compares the reference address with the tape address corresponding to the actual tape movement and derived from the rotation of the tape timer roller 2. When, the tape address is less than the reference address, the address comparator 4 sends the acceleration signal to the capstan servo circuit 8. In response to the acceleration signal, the capstan servo circuit 8 accelerates the servomotor 8a at a high speed, for example, 13% greater than the normal speed. Conversely, when the capstan servo circuit 8 receives the deceleration signal, the circuit 8 decelerates the servomotor 8a to a lower speed 13% less than the normal speed, for example. When the reference address coincides with the tape address, the tape speed is shifted to the normal speed according to the normal speed signal. Then the capstan servo operation based on the phase comparison between the CTL signal and the reference signal $S'_r$ is performed. As stated before, however, the lock-in operation resulting from the comparison between the reference address and the tape address is independent of the other lock-in operation preformed based upon the comparison between the CTL signal and the reference signal $S_r$. That is, in other words, the two lock-in operations cover different lock-in tape ranges. Accordingly, when the servo is operated by the phase comparison between the CTL signal and the reference signal $S_r$ after the actual tape address is coincident with the reference address, the actual tape address frequently diverges from the reference address, again. In this instance, the tape address synchronizing operation is not completed, and precise editing cannot be achieved.

In FIG. 2 showing one embodiment of the present invention, a phase detection circuit 9 is provided between the address comparator 4 and the capstan servo circuit 8. It is different from the prior art circuit shown in FIG. 1. As shown in FIG. 3, the phase detection circuit 9 includes a comparator 10 and three gates 11, 12 and 13. An auxiliary address a from a tape timer circuit 3 is supplied to the phase detection circuit 9. The tape timer circuit 3 receives pulses having a frequency of 1920 Hz during normal tape speed from a timer roller 2. In the tape timer circuit 3, the frame timing is produced by frequency-dividing the pulses of 1920 Hz, and a tape address A is generated based thereon. The auxiliary address a comprises 2 bits and is produced by frequency-dividing the 1920 Hz pulses into 1/16 and 1/32, signals and therefore, each frame may be divided into 4 segments, i.e., (0 0), (0 1), (1 0) and (1 1), based on the 1/16 and 1/32 signals. In FIG. 3, the auxiliary address a is compared with a predetermined value $\beta$ (zero in this embodiment). When they are equal, an output is sent to a terminal $T_1$; and when $a > \beta$, an output is sent to a terminal $T_2$. The acceleration and deceleration signals from the address comparator 4 are sent to the capstan servo-drive circuit 8 directly and through an OR gate 11, respectively, and the normal speed signal is gated by an AND gate 12 to the servo-drive circuit 8. The output at the terminal $T_1$ of the comparator 10 is supplied to the AND gate 12 for control, and AND output between the normal speed signal and the output from the terminal $T_2$ of the comparator 10 is supplied to the OR gate 11. A AND gate 13 produces the AND output between the normal speed signal and the output from the terminal $T_2$.

The principle of operation of the embodiment will be explained hereinafter. The magnetic tape starts to move after it has been rewound from the edit point by the pre-roll time value. First, since the tape address usually lags behind the reference address, the acceleration signal is delivered from the address comparator 4 so that the capstan rotates at a higher speed. When the tape address coincides with the reference address, the address comparator 4 delivers the normal speed signal, but because of the characteristics of the servo, the tape address leads the reference address so that the deceleration signal is then delivered from the address comparator 4. FIG. 4 is a timing chart showing the tape address synchronization. In FIG. 4, $S_r$ is the reference signal. A servo reference signal $S'_r$, delayed by a predetermined time $t_1$ (for example, a ¼ frame) from the reference signal $S_r$, is generated and the servo operates to synchronize the servo reference signal $S'_r$ with the CTL signal read out from the control track. The reference address $A_r$ is generated in accordance with the reference signal $S_r$ by the reference address generation circuit 7, and a tape address $A_T$ generated by the tape timer circuit 3 leads the reference address $A_r$ by $t_2$ (for example, a ¼ frame) in the synchronous coincident case. FIG. 4 shows an example in which the present invention is applied to a VTR of the SMPTE type C format. The 2 bit auxiliary address signal a indicates a resolution of a ¼ frame, and is synchronized with the tape address $A_T$. When the capstan servo has operated to align the servo reference signal $S'_r$ with the CTL signal, the auxiliary address a is (0 0). When the phase of the CTL signal leads that of the servo reference signal $S'_r$, the auxiliary address becomes (0 1), (1 0) or (1 1), depending on the advance. In FIG. 4 $R_c$ is a lock-in range within which the servo reference signal $S'_r$ and the CTL signal can be locked by the capstan servo operation, and $R_a$ is a lock-in range within which the tape address $A_T$ and the reference address $A_r$ can be locked by the address comparison servo operation. The two ranges $R_c$ and $R_a$ do not coincide. Accordingly, in the prior art, even if the two addresses $A_T$ and $A_r$ match at a point P within the lock-in range $R_a$, the capstan servo operation, in which the servo reference signal $S'_r$ and the CTL signal is phase-adjusted, can lead to an address modification, i.e., a between N and (N+1). In the present invention, when the reference address $A_r$ matches the tape address $A_T$, the auxiliary address a is still used for address comparison in the comparator 10 (FIG. 3), and, then, the tape speed is reduced until the auxiliary address a becomes (0 0). Thus, even if the capstan servo is later activated in response to the comparison between the servo reference signal $S'_r$ and the CTL signal, a readjustment which can lead to an address mismatch between the tape address $A_T$ and the reference address $A_r$ is not possible anymore. In FIG. 4, $R_i$ is the lock-in region of the present invention within which the tape address synchronizing operation can be accurately completed. In the embodiment shown in FIG. 3, when the address comparator 4 outputs the normal speed signal and the auxiliary address a is (0 0), the tape address synchronizing operation is always completed.

In the description referring to FIGS. 3 and 4, the time delay $t_2$ between the reference address $A_r$ and the tape address $A_T$ is considered as fixed ($\frac{1}{4}$ frame). In practice, however, this time delay $t_2$ varies because a slip occurs between the tape timer roller 2 and the magnetic tape 1 (FIG. 2). When such slip occurs, if the phase detector circuit 9 (FIG. 2) transmits the normal speed signal to the capstan servo-drive circuit 8 under the condition of the auxiliary address a (0 0), the servo reference signal $S'_r$ and the CTL signal are not locked with each other at the same addresses of the reference address $A_r$ and the tape address $A_T$. Therefore, a precise tape address synchronizing operation cannot be achieved. FIG. 5 shows a second embodiment of the present invention which can provide precise phase modification even when the slip occurs. The following description concentrates on the construction of a phase detection circuit 9. The second embodiment of FIG. 5 differs from that of FIG. 3 in that the value $\beta$, which is compared with the auxiliary address a in the comparator 10, is not fixed. In FIG. 5, the value $\beta$ can be selected as one of the four values (0 0), (0 1), (1 0) and (1 1). When the tape address synchronizing operation cannot be completed, that is, when the servo reference signal $S'_r$ is not locked with the CTL signal at the same addresses, the value $\beta$ is sequentially varied, and the tape address synchronizing operation is automatically completed. In FIG. 5, a block 14 produces the value $\beta$ to supply it to the comparator 10'. In the block 14, the value $\beta$ of (0 0) is initially set under the control of the start pulse $P_s$, and the value $\beta$ is shifted to (0 1), (1 0) and (1 1) in response to the trailing edge of a normal speed signal delivered from a AND gate 15, i.e., the timing of disappearance of the normal speed signal. In FIG. 5, for example, if (0 1) is selected for value $\beta$, an acceleration signal is produced by an AND gate 16 and is supplied through an OR gate 17 to the capstan servo-drive circuit 8 when the auxiliary address a is (0 0). Further, a deceleration signal is produced by an AND gate 18 and is supplied through an OR gate 19 to the circuit 8 when the auxiliary address a is (1 0) or (1 1). If the tape address synchronizing operation cannot be accomplished by this, the value $\beta$ is changed to (1 0) and the synchronizing operation is repeated. In the present invention, even when the slip occurs between the tape timer roller 2 and the magnetic tape 1, it is always possible to determine an address point at which the servo reference signal $S'_r$ is locked with the CTL signal. As a result, precise editing can be achieved.

What is claimed is:

1. A video tape recorder magnetic tape synchronizing apparatus for synchronizing said magnetic tape to a reference signal, said apparatus comprising:

capstan servo means for controlling the speed of a capstan motor which determines a playback speed for said magnetic tape, said capstan servo means including means responsive to a first and a second acceleration signal and a first and second deceleration signal for accelerating or decelerating, respectively, said tape playback speed;

means for producing tape addresses in synchronism with said tape playback speed, each said tape addresses corresponding to a respective video frame of said tape;

means for producing a plurality of auxiliary addresses, each said auxiliary address corresponding to a respective segment of said respective video frame;

means for producing reference addresses in synchronism with said reference signal;

means for comparing said reference addresses and said tape addresses and for generating said first acceleration and first deceleration signals, said signals being produced to control said playback speed to ensure that said reference and said tape addresses are synchronized; and auxiliary address comparing means for comparing said auxiliary addresses to a predetermined value and for generating said second acceleration and said second deceleration signals for further synchronizing said tape addresses to said reference signal, said auxiliary address comparing means being operative only when any of said tape addresses is equal to a corresponding one of said reference addresses.

2. The apparatus as in claim 1, wherein said auxiliary address comparing means comprises a comparator for comparing said predetermined value to said auxiliary addresses, said comparator generating said second acceleration signal when said auxiliary addresses are smaller than said predetermined value and generating said second deceleration signal when said auxilairy addresses are greater than said predetermined value.

3. The apparatus as in claim 1, wherein said auxiliary address producing means generate four auxiliary addresses for each said tape address.

4. The apparatus as in claim 3, wherein said predetermined value and said auxiliary addresses comprise two ditigal data bits.

5. The apparatus as in claim 1, wherein said means for producing reference addresses comprises a reference address counter for counting said reference signal and means for presetting said reference address counter to an initial reference address.

6. The apparatus as in claim 5, further comprising means for rewinding said magnetic tape to an initial tape location having an address which is equal to said initial reference address, and means for restarting said tape in synchronism with said means for presetting said reference address counter.

7. The apparatus as in claim 1, further comprising means for changiing said predetermined value when said reference and said tape addresses become unsynchronized after having been synchronized.

8. The apparatus as in claim 7, wherein said auxiliary address comparing means comprises a comparator for comparing said predetermined value to said auxiliary addresses, said comparator generating said second acceleration signal when said auxiliary addresses are less than said predetermined value and generating said second deceleration signal when said auxiliary addresses are greater than said predetermined value.

9. The apparatus as in claim 8, wherein said means for changing said predetermined value include means for presetting said means to a value of "0", said means thereafter incrementing said "0" value in response to each unsynchronization of said tape.

10. A video tape recorder magnetic tape synchronizing apparatus for synchronizing said magnetic tape to a reference signal, said apparatus comprising:

capstan servo means for controlling the speed of a capstan motor which determines a playback speed for said magnetic tape, said capstan servo means including:
  (a) means for synchronizing pulses received from a control track of said magnetic tape to a servo reference signal, said servo reference signal being dependent of said reference signal; and
  (b) responsive to an acceleration signal and to a first and second deceleration signal for accelerating or decelerating, respectively, said tape playback speed;
means for producing tape addresses in synchronism with said tape playback speed, each said tape addresses corresponding to a respective video frame of said tape;
means for producing a plurality of auxiliary addresses, each said auxiliary address corresponding to a respective segment of said respective video frame;
means for producing reference addresses in synchronism with said reference signal;
means for comparing said reference addresses and said tape addresses and for generating said acceleration and said first deceleration signals, said signals being produced to control said playback speed to ensure that said reference and said tape addresses are synchronized; and
auxiliary address comparing means for comparing said auxiliary addresses to a predetermined value to generate said second deceleration signal whenever said auxiliary address is greater than said predetermined value, said auxiliary comparing means being operative only when any of said tape addresses is equal to a corresponding one of said reference addresses.

11. The apparatus as in claim 10, wherein said auxiliary address comparing means comprises a comparator.

* * * * *